United States Patent
Ienaga (10) Patent No.: US 10,793,009 B2
(45) Date of Patent: Oct. 6, 2020

(54) VEHICLE DRIVING FORCE CONTROL APPARATUS

(71) Applicant: SUBARU CORPORATION, Tokyo (JP)

(72) Inventor: Hiroshi Ienaga, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/179,911

(22) Filed: Nov. 3, 2018

(65) Prior Publication Data

US 2019/0232798 A1 Aug. 1, 2019

(30) Foreign Application Priority Data

Jan. 31, 2018 (JP) .................. 2018-014250

(51) Int. Cl.
*B60L 15/20* (2006.01)
*B60R 16/03* (2006.01)
*B60R 16/02* (2006.01)
*B60K 6/52* (2007.10)
*B60R 16/023* (2006.01)
*B60K 6/44* (2007.10)

(52) U.S. Cl.
CPC .......... *B60L 15/20* (2013.01); *B60R 16/0231* (2013.01); *B60R 16/03* (2013.01); *B60K 6/44* (2013.01); *B60K 6/52* (2013.01); *B60L 2240/441* (2013.01); *B60L 2240/46* (2013.01)

(58) Field of Classification Search
CPC .. B60K 6/44; B60K 6/52; B60L 15/20; B60L 2240/441; B60L 2240/46; B60R 16/0231; B60R 16/03
See application file for complete search history.

(56) References Cited

U.S. PATENT DOCUMENTS

| 9,126,500 B2 * | 9/2015 | Ozaki ................. B60L 3/06 |
| 2009/0205887 A1 | 8/2009 | Tanaka | |
| 2013/0096764 A1 * | 4/2013 | Yamamoto ............ B60K 6/445 701/22 |

(Continued)

FOREIGN PATENT DOCUMENTS

| JP | H 07-046721 A | 2/1995 |
| JP | 2001-231101 A | 8/2001 |
| JP | 2007-014077 A | 1/2007 |

(Continued)

OTHER PUBLICATIONS

Japanese Office Action dated Nov. 12, 2019, in Japanese Patent Application No. 2018-014250 with an English translation.

(Continued)

*Primary Examiner* — Tyler J Lee (74) *Attorney, Agent, or Firm* — McGinn IP Law Group, PLLC (57) ABSTRACT

A vehicle driving force control apparatus that is provided in a vehicle provided with drive units configured to drive a driving wheel, and that is configured to control the drive units includes: a controller; and a determiner. The controller controls a driving force output by each of the drive units, within a range less than or equal to an upper limit value, on a basis of a driving command. The determiner determines whether each of the drive units is in a restriction-necessary state.

20 Claims, 4 Drawing Sheets

(56) References Cited

U.S. PATENT DOCUMENTS

2013/0325236 A1\* 12/2013 Endo ................ B60K 6/445
701/22

FOREIGN PATENT DOCUMENTS

| JP | 2013-129299 A | 7/2013 |
| JP | 2014-075867 A | 4/2014 |
| JP | 2015-070723 A | 4/2015 |
| JP | 2016-096594 A | 5/2016 |

OTHER PUBLICATIONS

Japanese Office Action dated Mar. 31, 2020, in Japanese Patent Application No. 2018-014250 with an English translation.

\* cited by examiner

VEHICLE DRIVING FORCE CONTROL APPARATUS

CROSS-REFERENCE TO RELATED APPLICATIONS

The present application claims priority from Japanese Patent Application No. 2018-014250 filed on Jan. 31, 2018, the entire contents of which are hereby incorporated by reference.

BACKGROUND

1. Technical Field

The present invention relates to a vehicle driving force control apparatus.

2. Related Art

Vehicles such as electric vehicles (EV) or hybrid electric vehicles (HEV) which have drive units for driving a driving wheel already exist. The drive unit such as an engine or a motor is typically controlled to output driving force within a limited range that has been preset. Also, control to temporarily lower an upper limit value of the driving force to be output may be performed in a case where the drive unit is in a restriction-necessary state, such as a case where the temperature of the drive unit rises excessively, for instance.

Japanese Unexamined Patent Application Publication (JP-A) No. H07-046721 discloses an EV having two motors for driving driving wheels, which, when the temperature of one of the motors has risen, lowers an upper limit value of the driving force of that motor to a continuous rating. JP-A No. 2013-129299 discloses an EV having a main motor for driving front wheels, and a sub motor for driving rear wheels, in which an output upper limit value of an inverter for driving the sub motor is made to decrease in a case where the temperature of the inverter exceeds a threshold value.

SUMMARY OF THE INVENTION

An aspect of the present invention provides a vehicle driving force control apparatus mountable on a vehicle provided with drive units configured to drive a driving wheel, and configured to control the drive units. The vehicle driving force control apparatus includes a controller and a determiner. The controller is configured to control a driving force output by each of the drive units, within a range less than or equal to an upper limit value, on a basis of a driving command. The determiner is configured to determine whether each of the drive units is a restricted drive unit or a non-restricted drive unit. The restricted drive unit is a drive unit in a restriction-necessary state the non-restricted drive unit is a drive unit not in restriction-necessary state. In a case where it is determined by the determiner that any one or more of the drive units are the restricted drive units, the controller switches both the upper limit value of the driving force of the one or more restricted drive units, from among the drive units, and the upper limit value of the driving force of the one or more non-restricted drive units, from among the drive units, from a normal upper limit value to a low upper limit value that is lower than the normal upper limit value.

An aspect of the present invention provides a vehicle driving force control apparatus mountable on a vehicle provided with drive units configured to drive a driving wheel, and configured to control the drive units. The vehicle driving force control apparatus includes circuitry. The circuitry is configured to control a driving force output by each of the drive units, within a range less than or equal to an upper limit value, on a basis of a driving command. The circuitry is configured to determine whether each of the drive units is a restricted drive unit or a non-restricted drive unit. The restricted drive unit is a drive unit in a restriction-necessary state the non-restricted drive unit is a drive unit not in restriction-necessary state. In a case where it is determined that any one or more of the drive units are the restricted drive units, the circuitry switches both the upper limit value of the driving force of the one or more restricted drive units, from among the drive units, and the upper limit value of the driving force of the one or more non-restricted drive units, from among the drive units, from a normal upper limit value to a low upper limit value that is lower than the normal upper limit value.

DETAILED DESCRIPTION

In the following, some preferred examples of the present invention are described in detail with reference to the accompanying drawings. Note that the following description is directed to illustrative instances of the disclosure and not to be construed as limiting to the present invention. Factors including, without limitation, numerical values, dimensions, shapes, materials, components, positions of the components, and how the components are coupled to each other are for purposes of illustration to give an easier understanding of the present invention, and are not to be construed as limiting to the present invention, unless otherwise specified. Further, elements in the following instances which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same minerals to avoid redundant description. Illustration of elements that are not directly related to the present invention is omitted.

As with the technology of the past described above, in a vehicle having drive units for driving a driving wheel, in a case where one of the drive units is in a restriction-necessary state due to, for instance, the temperature of the drive unit rising excessively, it is assumed that control is performed to lower the upper limit value of the driving force for only this drive unit. In addition, when the output of the drive unit that was in the restriction-necessary state decreases, the total driving force that is output from the drive units can be inhibited from decreasing by compensating for this reduction in output with driving force from another drive unit. Thus, an unpleasant sensation felt by the driver is able to be lessened.

However, in such control, it is assumed that the driver will continue to drive in the same manner as before, even in a case where one of the drive units has reached the restriction-necessary state. In this case, a high load will be continuously placed on another drive unit that is not in the restriction-necessary state, so this drive unit is liable to reach the restriction-necessary state due to the temperature of the drive unit rising excessively or the like. If, as a result, the drive units reach the restriction-necessary state, the total driving force of the vehicle will decrease, which will not only result in the driver feeling an unpleasant sensation, but also the inability to output a large driving force, even in a situation where a large driving force is required, such as with rapid acceleration, due to the drive units being in the restriction-necessary state, which is problematic.

Therefore, it is desirable to provide a vehicle driving force control apparatus which is capable of continuing suitable driving, even after a case where any one of drive units for driving a driving wheel is in a restriction-necessary state.

Figure 1:
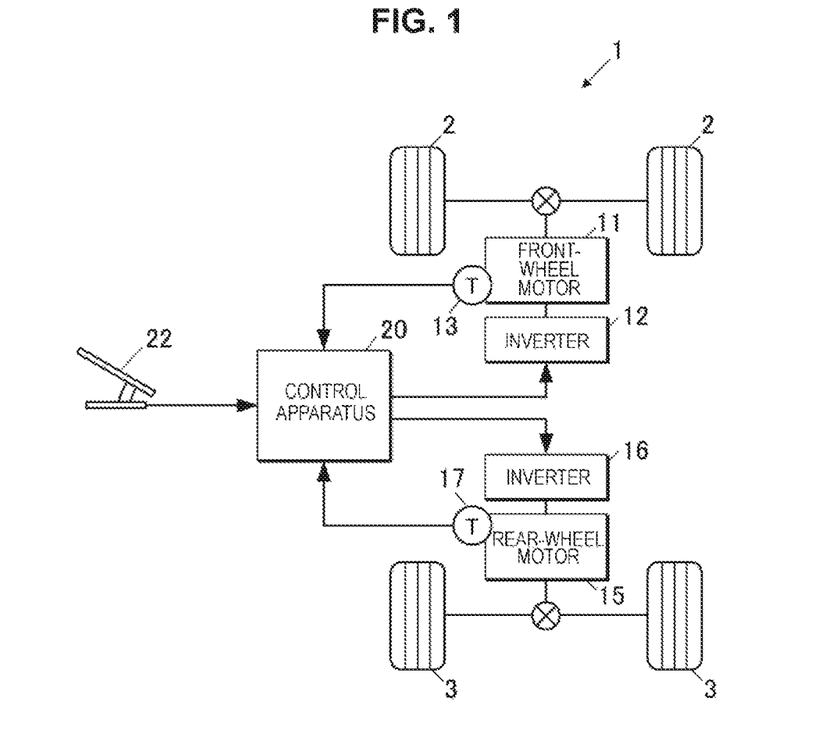
FIG. 1 is block diagram of a vehicle according to an example of the present invention.

FIG. 1 is a block diagram of a vehicle according to an example of the present invention. A vehicle 1 according to the present example is an electric vehicle (EV), and is provided with two front wheels 2, two rear wheels 3, a front-wheel motor 11 for driving the front wheels 2, and a rear-wheel motor 15 for driving the rear wheels 3. Also, the vehicle 1 has an inverter 12 that outputs a driving current to the front-wheel motor 11, an inverter 16 that outputs a driving current to the rear-wheel motor 15, a control apparatus 20 that performs driving control of the front-wheel motor 11 and the rear-wheel motor 15, and a driving operation unit that includes an accelerator pedal 22. Temperature sensors 13 and 17 are provided in the front-wheel motor 11 and the rear-wheel motor 15, respectively. In one example, f these components, the front wheels 2 and the rear wheels 3 are may serve as a "driving wheel" according to the present example. The front-wheel motor 11 and the rear-wheel motor 15 correspond to one example of the drive units according to the present invention. In one example, the control apparatus 20 may serve as a "driving force control apparatus", and as a "controller" and a "determiner".

The control apparatus 20 includes a single electronic control unit (ECU) or ECUs that operate in conjunction with each other, and controls the front-wheel motor 11 and the rear-wheel motor 15 via the inverters 12 and 16 on the basis of a driving command from the driving operation unit. Also, the control apparatus 20 monitors the states of the front-wheel motor 11 and the rear-wheel motor 15 on the basis of signals from the temperature sensors 13 and 17.

<Driving Force Control>

Figure 2:
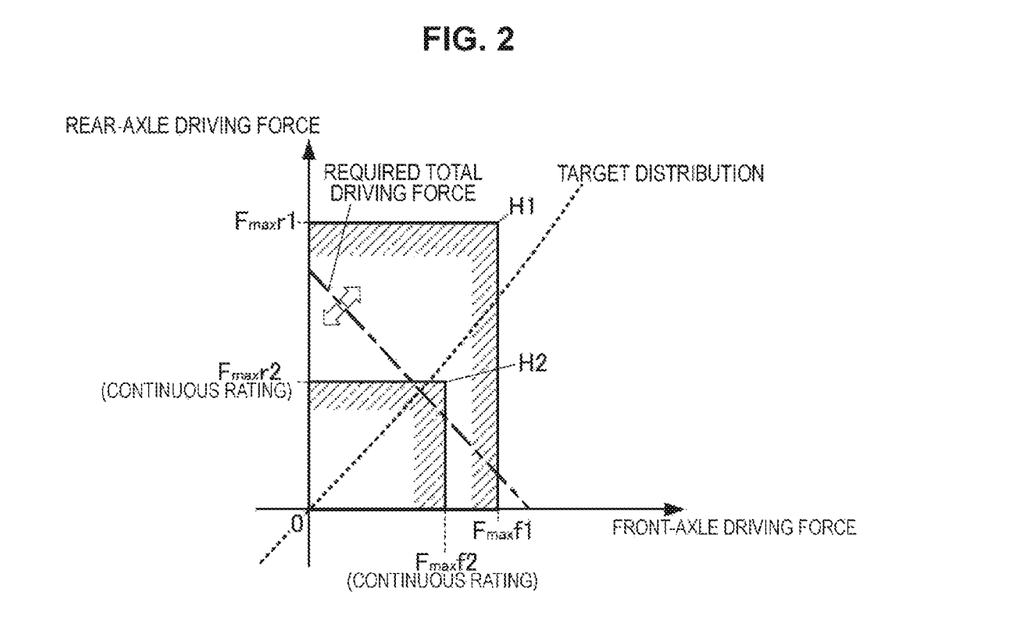
FIG. 2 is a graph explaining output control of a front-axle driving force and a rear-axle driving force.

FIG. 2 is a graph explaining output control of a front-axle driving force and a rear-axle driving force. In this graph, the horizontal axis represents driving force output by the front-wheel motor 11 (referred to as "front-axle driving force"), and the vertical axis represents driving force output by the rear-wheel motor 15 (referred to as "rear-axle driving force").

The control apparatus 20 receives a driving command for acceleration that includes information relating to a pedal operation amount (hereinafter, referred to as "accelerator operation amount") from the accelerator pedal 22, and calculates a required total driving force required for the vehicle 1 in accordance with the accelerator operation amount. The control apparatus 20 calculates the required total driving force so as to become larger as the accelerator operation amount increases. Moreover, the control apparatus 20 calculates a distribution ratio of the required total driving force for the front-wheel motor 11 and the rear-wheel motor 15. The distribution ratio is determined by making corrections on the basis of a target distribution that provides high running stability and high efficiency, for instance, in accordance with various other conditions. Also, the control apparatus 20 causes the front-wheel motor 11 and the rear-wheel motor 15 to operate via the inverters 12 and 16 so as to obtain the distributed required driving force of the front-wheel motor 11 and the required driving force of the rear-wheel motor 15. The required driving force of the front-wheel motor 11, the required driving force of the rear-wheel motor 15, and the required total driving force are substantially equivalent to the front-axle driving force, the rear-axle driving force, and the total driving force that are actually output.

As illustrated in FIG. 2, the driving force of the front-wheel motor 11 is controlled to within a first upper limit value $F_{max}f1$ during normal operation, and is controlled to within a second upper limit value $F_{max}f2$ when the driving force is restricted. The first upper limit value $F_{max}f1$ is a driving force that is a limit when the front-wheel motor 11 outputs for a relatively short predetermined period of time. This first upper limit value $F_{max}f1$ may be a fixed value or a value that changes in accordance with the temperature, current, or rotation speed or the like of the front-wheel motor 11. The second upper limit value $F_{max}f2$ is a continuous rating for the front-wheel motor 11, for instance, and represents a value that is a limit when the front-wheel motor 11 outputs continuously. Alternatively, the second upper limit value $F_{max}f2$ may be a value determined on the basis of the continuous rating, such as a value included in a range from 80% to 120% of the continuous rating. The second upper limit value $F_{max}f2$ may be a fixed value or a value that changes in accordance with the temperature, current, or rotation speed or the like of the front-wheel motor 11. In one example, the second upper limit value $F_{max}f2$ may serve as a "low upper limit value".

Similarly, the driving force of the rear-wheel motor 15 is controlled to within a first upper limit value $F_{max}r1$ during normal operation, and is controlled to within a second upper limit value $F_{max}r2$ when the driving force is restricted. The first upper limit value $F_{max}r1$ is a driving force that is a limit when the rear-wheel motor 15 outputs for a relatively short predetermined period of time. This first upper limit value $F_{max}r1$ may be a fixed value or a value that changes in accordance with the temperature, current, or rotation speed or the like of the rear-wheel motor 15. The second upper limit value $F_{max}r2$ is a continuous rating for the rear-wheel motor 15, for instance, and represents a value that is a limit when the rear-wheel motor 15 outputs continuously. Alternatively, the second upper limit value $F_{max}r2$ may be a value determined on the basis of the continuous rating, such as a value included in a range from 80% to 120% of the continuous rating. The second upper limit value $F_{max}r2$ may be a fixed value or a value that changes in accordance with the temperature, current, or rotation speed or the like of the rear-wheel motor 15. In one example, the second upper limit value $F_{max}r2$ may server as a "low upper limit value".

By setting each of such upper limit values of the driving force, the control apparatus 20 calculates the required total driving force and the distribution ratio so as to fall within a range H1 (a range within the first upper limit values $F_{max}f1$ and $F_{max}r1$) in FIG. 2 during normal operation. Also, the control apparatus 20 calculates the required total driving force and the distribution ratio so as to fall within a range H2

(the second upper limit values $F_{max}f2$ and second upper limit value $F_{max}r2$) when driving force is restricted. With the range H1 during normal operation, the maximum value of the required total driving force is the sum "first upper limit value $F_{max}f1$+first upper limit value $F_{max}r1$" of the upper limit value of the front-axle driving force and the upper limit value of the rear-axle driving force during normal operation, and the distribution at this time is such that the ratio of the front-wheel motor 11 is smaller than it is with the target distribution. With the range H2 during restricted operation, the maximum value of the total driving force is the sum "second upper limit value $F_{max}f2$+second upper limit value $F_{max}r2$" of the upper limit value of the front-axle driving force and the upper limit value of the rear-axle driving force, and the distribution at this time is such that the ratio of the front-wheel motor 11 is greater than it is with the target distribution.

Note that the driving force of the front-wheel motor 11 and the driving force of the rear-wheel motor 15 can not simply be set to any values in the range equal to or less than the upper limit values. For instance, during regeneration with the front-wheel motor 11 or the rear-wheel motor 15, or when the shift position is reverse or the like, negative torque may be generated in the front-wheel motor 11 or the rear-wheel motor 15. At such times, the lower limit value (a negative value) is set for the driving force, and the control apparatus 20 controls the driving force of the front-wheel motor 11 or the driving force of the rear-wheel motor 15 within a range equal to or less than the upper limit value and equal to or greater than the lower limit value.

<State Monitoring>

The control apparatus 20 constantly receives a signal from the temperature sensor 13 and monitors whether the temperature of the front-wheel motor 11 is not rising excessively, on the basis of this signal. A state in which the temperature of the front-wheel motor 11 has risen excessively refers to a restriction-necessary state in which output of the front-wheel motor 11 needs to be restricted. In one example, the "restriction-necessary state" is not limited to only a state in which the temperature has risen excessively, and may also include a state based on a factor other than temperature as long as the state requires that the output be restricted.

The control apparatus 20 monitors whether the rear-wheel motor 15 is not similarly in a restriction-necessary state, on the basis of a signal from the temperature sensor 17. In one example, the front-wheel motor 11 or the rear-wheel motor 15 that is determined to be in the restriction-necessary state may serve a "restricted drive unit", and the front-wheel motor 11 or the rear-wheel motor 15 that is not determined to be in the restriction-necessary state may serve as a "non-restricted drive unit".

<Switching the Upper Limit Value of the Driving Force>

Figure 3:
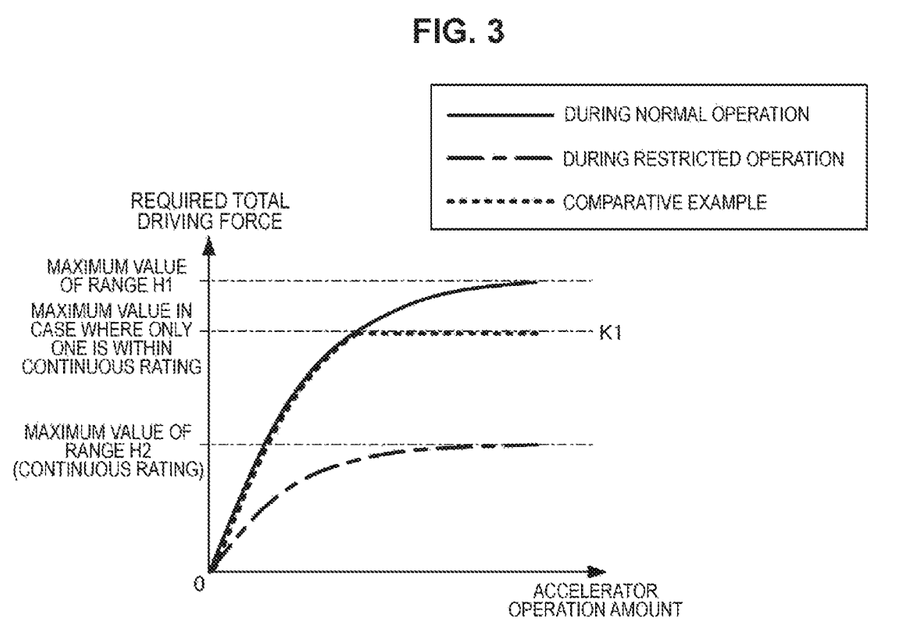
FIG. 3 is a graph illustrating a relationship between an accelerator operation amount and a total driving force during normal operation, during restricted operation, and according to a comparative example.

FIG. 3 is a graph illustrating the relationship between the accelerator operation amount and the total driving force during normal operation, during restricted operation, and in a comparative example.

As described above, the control apparatus 20 calculates the required total driving force and the distribution ratio within the range H1 (refer to FIG. 2) during normal operation. As illustrated by the characteristic line during normal operation in FIG. 3, the relationship between the accelerator operation amount and the required total driving force during normal operation is set such that the required total driving force is near the maximum value of the range H1 when the accelerator operation amount is near the maximum value.

In a case where it is determined that one of the front-wheel motor 11 or the rear-wheel motor 15 is in the restriction-necessary state, the control apparatus 20 switches the range of the driving force output by the front-wheel motor 11 and the rear-wheel motor 15 from the normal range H1 to the range H2 during restricted operation (refer to FIG. 2). That is, the control apparatus 20 switches the upper limit value of the driving force of the front-wheel motor 11 from the normal first upper limit value $F_{max}f1$ to the low second upper limit value $F_{max}f2$, and switches the upper limit value of the driving force of the rear-wheel motor 15 from the normal first upper limit value $F_{max}r1$ to the low second upper limit value $F_{max}r2$. The control apparatus 20 switches the range of the driving force in this way even if one of the front-wheel motor 11 or the rear-wheel motor 15 is not determined to be in the restriction-necessary state.

The control apparatus 20 calculates the required driving force of the front-wheel motor 11 and the rear-wheel motor 15 within the range H2 in FIG. 2 when the driving force is restricted, by switching this range of the driving force. The relationship between the accelerator operation amount and the required total driving force during restricted operation is set such that the required total driving force is near the maximum value of the range H2 when the accelerator operation amount is near the maximum value, as illustrated by the characteristic line during restricted operation in FIG. 3.

Note that the relationship between the accelerator operation amount and the required total driving force during normal operation, and the relationship between the accelerator operation amount and the required total driving force during restricted operation may be determined by a driving force map that indicates these corresponding relationships. Note that the relationship between the accelerator operation amount and the required total driving force during normal operation does not have to be a one-to-one relationship, and may be a relationship in which the required total driving force changes in accordance with the motor rotation speed and the vehicle speed and the like, even if the accelerator operation amount is the same. The same applies to the relationship between the accelerator operation amount and the required total driving force during restricted operation.

Here, the difference in operation from the comparative example will be described. The characteristic line of the comparative example in FIG. 3 illustrates a case where only the upper limit value of the driving force of the front-wheel motor 11 is restricted to the low second upper limit value $F_{max}f2$ (continuous rating), in a case where it is determined that the front-wheel motor 11 is in the restriction-necessary state. That is, the characteristic line of the comparative example in FIG. 3 illustrates a case where the upper limit value of the driving force of the rear-wheel motor 15, which is not in the restriction-necessary state, remains at the normal first upper limit value $F_{max}r1$. In a case where the upper limit value of the driving force is switched in this way, the driver will not feel a significant change in the total driving force, and thus will continue to drive in the same manner as before, so thereafter a high load is likely to be placed on the rear-wheel motor 15 that was not determined to be in the restriction-necessary state. As a result, a situation is likely to occur in which the temperature of the rear-wheel motor 15 rises excessively such that not only the front-wheel motor 11 but also the rear-wheel motor 15 will reach the restriction-necessary state. When both the front-wheel motor 11 and the rear-wheel motor 15 reach the restriction-necessary state, rapid acceleration is unable to be obtained even if there is a request for it.

Meanwhile, in the present example, in a case where it is determined that the front-wheel motor 11 is in the restriction-necessary state, for instance, the upper limit values of the driving forces of both the front-wheel motor 11 and the rear-wheel motor 15 are switched to the low second upper limit values $F_{max}f2$ and $F_{max}r2$. Therefore, driving that places a high load on both the front-wheel motor 11 and the rear-wheel motor 15 is thereafter inhibited. Also, the relationship between the accelerator operation amount and the required total driving force switches from the relationship line during normal operation in FIG. 3 to the relationship line during restricted operation. Therefore, the driver is able to be aware that the driving force is restricted. Consequently, the driver will switch the manner of driving to one with a low load, so the front-wheel motor 11 that was determined to be in the restriction-necessary state can be expected to recover. Also, at this time, the potential ability to be able to output driving force to the normal first upper limit value $F_{max}f1$ is maintained for the rear-wheel motor 15 which is not determined to be in the restriction-necessary state.

<Rapid Acceleration Request>

Figure 4:
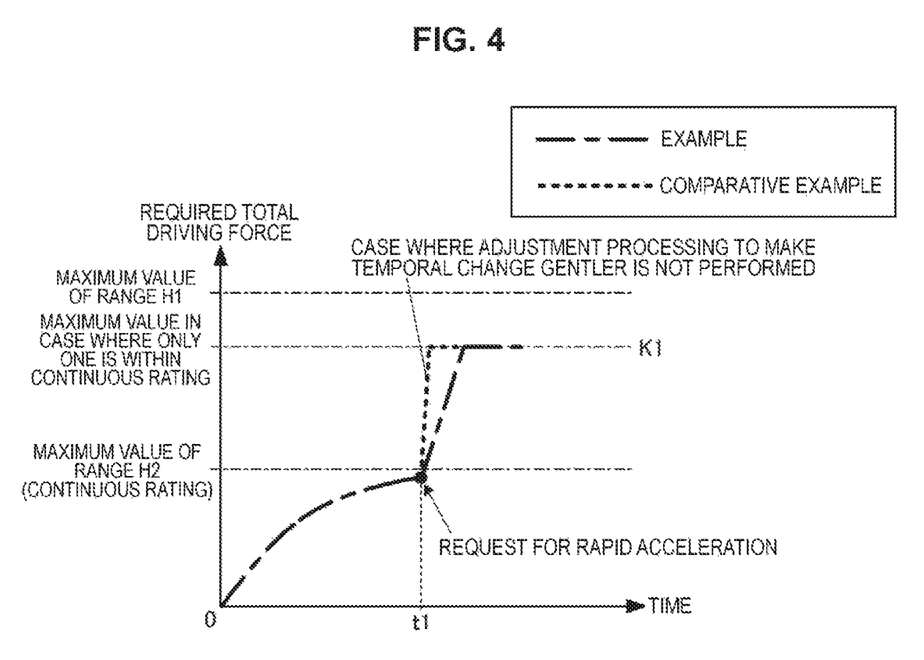
FIG. 4 is a graph illustrating a change in a required total driving force in a case where there is a request for sudden acceleration when driving force is restricted.

FIG. 4 is a graph illustrating a change in the required total driving force in a case where there is a request for rapid acceleration when the driving force is being restricted. FIG. 4 illustrates a case where the accelerator operation amount gradually increases until timing t1, and then there is a driving command requesting rapid acceleration at timing t1.

The control apparatus 20 determines that there is an operation command requesting rapid acceleration in a case when the accelerator pedal 22 has been suddenly depressed, a case where the accelerator pedal 22 is greatly depressed within a predetermined period of time, or a case where a button has been operated requesting rapid acceleration, for instance, on the basis of a signal from the driving operation unit.

The control apparatus 20 switches the upper limit value of the driving force of the front-wheel motor 11 or the rear-wheel motor 15, whichever is not determined to be in the restriction-necessary state, from the lower limit value to the upper limit value, in a case where there is a request for rapid acceleration when the driving force is restricted. For instance, with the front-wheel motor 11, the upper limit value is switched from the second upper limit value $F_{max}f2$ during restricted operation to the first upper limit value $F_{max}f1$ during normal operation, and with the rear-wheel motor 15, the upper limit value is switched from the second upper limit value $F_{max}r2$ during restricted operation to the first upper limit value $F_{max}r1$ during normal operation (refer to FIG. 2). Here, the upper limit value of the driving force of the front-wheel motor 11 or the rear-wheel motor 15 that is in the restriction-necessary state is kept at the low upper limit value. By switching the upper limit value in this way, the upper limit value of the driving force of the front-wheel motor 11 or the rear-wheel motor 15 that was capable of outputting a potentially large driving force is switched to a high value.

Then, the control apparatus 20 calculates the required total driving force such that the required total driving force suddenly rises to a maximum value K1 or therearound, within the range of the driving force after the switch, on the basis of the request for rapid acceleration. As a result, a required total driving force that suddenly increases due to the request for rapid acceleration is calculated as illustrated after timing t1 in FIG. 4. Then, the vehicle 1 is made to generate a large total driving force in accordance with the request for rapid acceleration, so the vehicle 1 can be made to accelerate rapidly.

Here, along with switching of the upper limit value of the driving force, the control apparatus 20 also uses adjustment control to make the temporal change of the required driving force gentler such that the temporal change of the required total driving force will not be too sudden. For instance, if the adjustment control is not performed, the required total driving force will end up rising too suddenly as illustrated by the characteristic line of the comparative example in FIG. 4, but with the adjustment processing described above, the rise in the required total driving force is relatively moderate, so excessive rapid acceleration of the vehicle 1 can be suppressed.

<Control Process>

Figure 5:
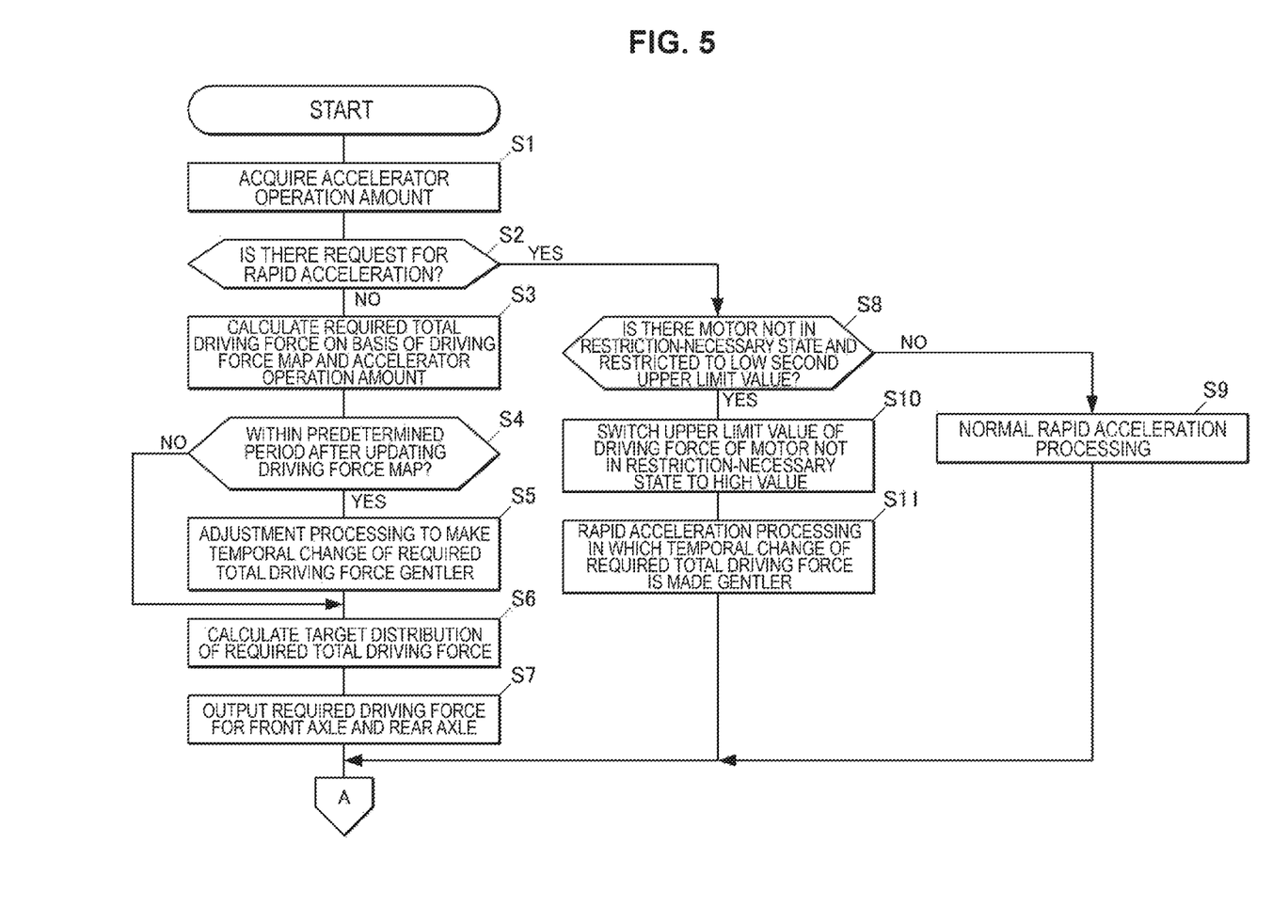
FIG. 5 is a first part of a flowchart of driving force control processing executed by a control apparatus.
Figure 6:
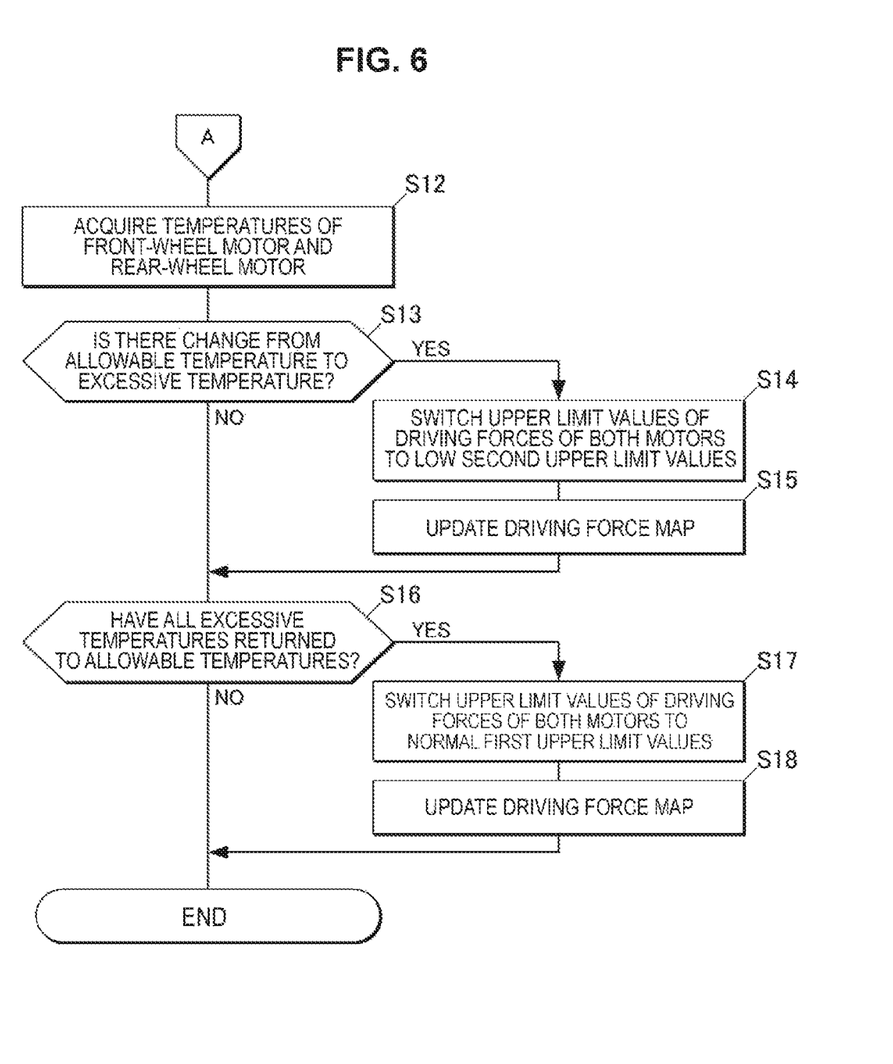
FIG. 6 is a second part of the flowchart of the driving force control processing executed by the control apparatus.

Next, an example of a control process to realize the processing by the control apparatus 20 described above will be described. The control process illustrated below is merely an example and does not limit the present invention. FIG. 5 and FIG. 6 illustrate a flowchart of driving force control processing executed by the control apparatus.

This driving force control processing starts when the vehicle 1 is started, and is then repeatedly executed continuously by the control apparatus 20. When the driving force control processing is started, the control apparatus 20 acquires the accelerator operation amount by receiving a signal from the accelerator pedal 22 (step S1). Next, the control apparatus 20 determines whether there is a request for rapid acceleration on the basis of a change in the accelerator operation amount or a signal from a rapid acceleration button or the like (step S2). If the result is such that there is no request for sudden acceleration, the control apparatus 20 calculates the required total driving force on the basis of the driving force map and the accelerator operation amount (step S3).

Next, the control apparatus 20 determines whether the current point in time is within a predetermined period after updating the driving force map (step S4), and if so, the control apparatus 20 adjusts the temporal change of the required total driving force to be gentler (step S5), and then moves the processing on to the next step. In step S5, the control apparatus 20 is able to realize the adjustment that makes the temporal change of the required total driving force gentler by performing a calculation to correct the required total driving force calculated in step S3 such that the temporal change becomes gentler. Here, the slope of the temporal change of the required total driving force may be able to be changed by a person that performs settings in the vehicle 1, by rewriting a setting data of the control apparatus 20. In one example, Step S5 may server as an "adjustment control". Also, if the result of the determination in step S4 is such that the current point in time is not within the predetermined period, the control apparatus 20 moves the processing directly on to the next step.

When the processing moves to the next step, the control apparatus 20 calculates a target distribution of the required total driving force (step S6), and outputs a front-axle required driving force and a rear-axle required driving force determined from the required total driving force and the target distribution (step S7). As a result of this required driving force being output, the front-wheel motor 11 and the rear-wheel motor 15 are controlled via the inverters 12 and 16 such that the required driving force is output. When the required driving force is output, the control apparatus 20 moves the processing on to steps S12 to S18 for monitoring the temperatures of the front-wheel motor 11 and the rear-wheel motor 15.

On the other hand, if the result of the determination processing in step S2 is such that there is a request for rapid acceleration, the control apparatus 20 moves the processing on to steps S8 to S11 to realize rapid acceleration. In this processing, the control apparatus 20 first determines whether there is a motor that is not determined to be in the restriction-necessary state and in which the upper limit value of the driving force is restricted to the low second upper limit value (the second upper limit value $F_{max}f2$ for the front-wheel motor 11 and the second upper limit value $F_{max}r2$ for the rear-wheel motor 15) (step S8). If both the front-wheel motor 11 and the rear-wheel motor 15 are operating normally, in which neither is determined to be in the restriction-necessary state, the determination result of step S8 will be "NO". On the other hand, in a case where one of the front-wheel motor 11 or the rear-wheel motor 15 is determined to be in the restriction-necessary state and the range of the driving force has been switched to the range H2 during restricted operation (FIG. 2), the determination result of step S8 will be "YES".

In a case where the determination result of step S8 is "NO", the control apparatus 20 executes normal rapid acceleration processing to abruptly increase the required total driving force for a short predetermined period (step S9). In step S9, the control apparatus 20 repeatedly, over the predetermined period during which rapid acceleration is performed, calculates the required total driving force, calculates the distribution ratio of the front axle and the rear axle, and outputs the required driving force for the front axle and the rear axle. As a result of this processing, the driving force of the vehicle 1 abruptly rises for a short predetermined period such that rapid acceleration of the vehicle 1 is realized. Then, when the short predetermined period of rapid acceleration has passed, the control apparatus 20 moves the processing on to the next step.

In a case where the determination result of step S8 is "YES", the control apparatus 20 first switches the upper limit value of the driving force of the front-wheel motor 11 or the rear-wheel motor 15, whichever is not in the restriction-necessary state, to the high upper limit value (step S10). As the high upper limit value, for instance, the first upper limit value $F_{max}f1$ during normal operation can be employed with the front-wheel motor 11, and the first upper limit value $F_{max}r1$ during normal operation can be employed with the rear-wheel motor 15. The processing in step S10 is one instance of the processing executed by the controller according to the present example. Then, the control apparatus 20 executes rapid acceleration processing that abruptly increases the required total driving force for a short predetermined period, within the switched driving force range (step S11). However, the rapid acceleration processing in step S11 is immediately after the upper limit value of the driving force of one of the front-wheel motor 11 or the rear-wheel motor 15 has been switched, so there is a possibility that the change in the required total driving force may be too abrupt. Therefore, in step S11, adjustment control to make the temporal change of the required total driving force gentler is used in combination. Here, the slope of the temporal change of the required total driving force may be able to be changed by a person that performs settings in the vehicle 1, by rewriting the setting data of the control apparatus 20. In one example, this adjustment processing may serve as an "adjustment control" example.

In step S11 described above, the control apparatus 20 repeatedly, over the predetermined period during which rapid acceleration is performed, calculates the required total driving force, calculates the distribution ratio of the front axle and the rear axle, and outputs the required driving force for the front axle and the rear axle. Here, the control apparatus 20 calculates the required total driving force so as to reach a large driving force in a short time, within the range of the driving force switched to in step S10 (with one of the rear-axle driving force or the front-axle driving force being within the low upper limit value during restricted operation, and the other being within a high upper limit value). In addition, the control apparatus 20 calculates the required total driving force while adjusting the change to be gentler, such that the temporal change of the required total driving force will not be too abrupt. Then, when the short predetermined period of rapid acceleration has passed, the control apparatus 20 moves the processing on to the next step. The rise in the required total driving force illustrated in FIG. 4 and the rapid acceleration of the vehicle 1 are realized by the switching of the upper limit value of the driving force in step S10 and the rapid acceleration processing in step S11.

When the processing proceeds on to steps S12 to S18 for monitoring the temperature, the control apparatus 20 first acquires the temperatures of the front-wheel motor 11 and the rear-wheel motor 15 by receiving signals from the temperature sensors 13 and 17 (step S12). Then, the control apparatus 20 determines whether the temperature of one of the front-wheel motor 11 or the rear-wheel motor 15 has changed from an allowable temperature to an excessive temperature (restriction-necessary state) by comparing the acquired temperatures with a threshold value or the like (step S13).

If the result is such that such a change has occurred, the control apparatus 20 switches the upper limit values of the driving forces of both the front-wheel motor 11 and the rear-wheel motor 15 to the low second upper limit value $F_{max}f2$ and $F_{max}r2$ during restricted operation (step S14). Here, the control apparatus 20 may write information indicating that the upper limit values of the driving forces have been switched (such as flag information or the upper limit values after the switch), to a storage unit within which the setting data is stored. Furthermore, the control apparatus 20 updates the driving force map indicating the relationship between the accelerator operation amount and the required total driving force, in accordance with a switch to the upper limit value during restricted operation (step S15). As a result of this update, the control apparatus 20 then calculates the required total driving force corresponding to the accelerator operation amount, in a relationship as illustrated by the characteristic line during restricted operation in FIG. 3, in subsequent step S3. The processing in steps S14 and S15 is one instance of processing executed by the controller according to the present example.

Also, the control apparatus 20 determines whether there is a change from a state in which the temperature of one or both of the front-wheel motor 11 and the rear-wheel motor 15 is excessive to a state in which the temperatures of both have returned to an allowable temperature, by comparing the temperatures acquired in step S12 with a threshold temperature, or the like (step S16). There may be a difference provided between the threshold temperature for determining whether the temperature is excessive in step S13 and the threshold value for determining whether the temperature is allowable in step S16, and hysteresis may be added to the determining characteristics in step S13 and step S16. Steps S13 and S16 is one example of processing executed by the determiner according to the present example.

If the result of the determination in step S16 is such that there is such a change, the control apparatus 20 switches the upper limit values of the driving forces of the front-wheel motor 11 and the rear-wheel motor 15 to the first upper limit values $F_{max}f1$ and $F_{max}r1$ during normal operation (step S17). Here, the control apparatus 20 may write information indicating that the upper limit values of the driving forces have been switched (such as flag information or the upper limit values after the switch), to the storage unit within which the setting data is stored. Furthermore, the control apparatus 20 updates the driving force map indicating the relationship between the accelerator operation amount and the required total driving force, in accordance with a switch to the normal upper limit value (step S18). As a result of this update, the control apparatus 20 then calculates the required total driving force corresponding to the accelerator operation amount, in the relationship as illustrated by the characteristic line during normal operation in FIG. 3, in subsequent step S3. The processing in step S18 is one instance of processing executed by the controller according to the present example.

When the steps S12 to S18 for monitoring the temperatures are complete, the control apparatus 20 ends one cycle of the driving force control processing. Then in the next cycle, the control apparatus 20 again starts the driving force control processing and repeats the processing from step S1. The control of driving force in response to the driving command, the switching of the upper limit values of the driving forces based on the monitoring of the state, and the output control of the driving force corresponding to the request for rapid acceleration, which have been described above, are realized as a result of such driving force control processing.

As described above, according to the present example, while the vehicle 1 is being operated, the control apparatus 20 monitors whether the front-wheel motor 11 and the rear-wheel motor 15 are in the restriction-necessary state (the state in which the temperatures have risen excessively). Then, if it is determined that any one of these motors is in the restriction-necessary state, the control apparatus 20 restricts the driving forces of both the front-wheel motor 11 and the rear-wheel motor 15, and switches the upper limit values of the driving forces to the low second upper limit values $F_{max}f2$ and $F_{max}r2$. As a result, a situation in which an excessive load is placed on the front-wheel motor 11 or the rear-wheel motor 15, whichever is not determined to be in the restriction-necessary state, due to the driver continuing to drive the vehicle 1 in the same manner thereafter or the like is inhibited. Therefore, both the front-wheel motor 11 and the rear-wheel motor 15 are inhibited from falling into the restriction-necessary state.

Also, according to the present example, even when the driving forces of both the front-wheel motor 11 and the rear-wheel motor 15 are restricted, whichever motor is not determined to be in the restriction-necessary state maintains the ability to output driving force to a potentially high upper limit value. Also, in a case where there is a driving command requesting rapid acceleration when the driving force is being restricted, the control apparatus 20 switches the upper limit value of the driving force of the front-wheel motor 11 or the rear-wheel motor 15 that is not in the restriction-necessary state to the high upper limit value. Then, the control apparatus 20 thereafter executes control for rapid acceleration. As a result, a large driving force is output so that the vehicle 1 can rapidly accelerate when there is a need for rapid acceleration, even if the driving force is being restricted.

Also, according to the present example, the control apparatus 20 of the vehicle 1 switches the relationship between the magnitude of the accelerator operation amount and the required total driving force in the manner illustrated by the characteristic line during normal operation and the characteristic line during restricted operation in FIG. 3, when the upper limit values of the driving forces of the front-wheel motor 11 and the rear-wheel motor 15 are switched. As a result, the driver is able to be appropriately aware of when the driving force is being restricted, and when the restriction on the driving force is lifted. Also, driving operability related to acceleration can be improved both when the driving force is being restricted and during normal operation.

Also, according to the present example, the control apparatus 20 of the vehicle 1 adjusts the temporal change of the required total driving force following a switch to be gentler, when changing the upper limit value of the driving force of the front-wheel motor 11 or the rear-wheel motor 15, whichever is not determined to be in the restriction-necessary state (steps S5 and S11). As a result, the vehicle 1 can be inhibited from excessively accelerating or decelerating following a switch of the upper limit value of the driving force.

Heretofore, an example of the present invention has been described. However, the present invention is not limited to this example. For instance, in the example described above, the front-wheel motor that drives the front wheels and the rear-wheel motor that drives the rear wheels are illustrated as drive units. However, the drive units according to the present invention may be two drive units that drive the same driving wheel. Also, the drive units according to the present invention may be an internal combustion engine (an engine) and an electric motor. Also, in the example described above, a state in which the temperature has risen excessively is given as the restriction-necessary state of the drive unit, but the restriction-necessary state of the drive unit may include various other states as long as they are states in which the upper limit value of the driving force needs to be reduced. Also, the motor and the inverter may be regarded as a single drive unit, and a state in which the temperature of the inverter has risen excessively may be regarded as the restriction-necessary state of the drive unit. In addition, the details illustrated in the example can be changed, as appropriate, within the scope of the invention.

The invention claimed is:

1. A vehicle driving force control apparatus mountable on a vehicle provided with drive units configured to drive a driving wheel, and configured to control the drive units, the vehicle driving force control apparatus comprising:
    a controller configured to control a driving force output by each of the drive units, within a range less than or equal to an upper limit value, on a basis of a driving command; and
    a determiner configured to determine, according to a predetermined condition of each of the drive units, whether each of the drive units is a restricted drive unit or a non-restricted drive unit, the restricted drive unit being a drive unit in a restriction-necessary state according to a level of the predetermined condition, the non-restricted drive unit being a drive unit in a default state, wherein
    in a case where it is determined by the determiner that any one or more of the drive units are the restricted drive units, the controller switches both the upper limit value of the driving force of the one or more restricted drive units, from among the drive units, and the upper limit value of the driving force of the one or more non-restricted drive units, from among the drive units, from a normal upper limit value to a low upper limit value that is lower than the normal upper limit value.

2. The vehicle driving force control apparatus according to claim 1, wherein
    in a case where there is a driving command requesting a rapid acceleration after the upper limit values of the driving forces of both the one or more restricted drive unit and the one or more non-restricted drive unit have been switched to the low upper limit values, the controller switches the upper limit value of the driving force of the non-restricted drive unit to an upper limit value that is higher than the low upper limit value.

3. The vehicle driving force control apparatus according to claim 2, wherein
the controller controls an amount of a total driving force output from the drive units, in accordance with a driving command for an acceleration, and moreover, causes a corresponding relationship between the driving command for the acceleration and the amount of the total driving force to change in accordance with a change in an upper limit value of the total driving force.

4. The vehicle driving force control apparatus according to claim 3, wherein
the controller controls an amount of a total driving force output from the drive units, in accordance with a driving command for an acceleration, and moreover, when the controller switches the upper limit value of the driving force of the one or more non-restricted drive units, the controller performs an adjustment control in which a temporal change in the total driving force following the switch of the upper limit value is adjusted to be gradually lower.

5. The vehicle driving force control apparatus according to claim 4, wherein
the low upper limit value is a value determined on a basis of a continuous rating of a drive unit to which the low upper limit value is to be applied, from among the drive units.

6. The vehicle driving force control apparatus according to claim 3, wherein
the low upper limit value is a value determined on a basis of a continuous rating of a drive unit to which the low upper limit value is to be applied, from among the drive units.

7. The vehicle driving force control apparatus according to claim 2, wherein
the controller controls an amount of a total driving force output from the drive units, in accordance with a driving command for an acceleration, and moreover, when the controller switches the upper limit value of the driving force of the one or more non-restricted drive units, the controller performs an adjustment control in which a temporal change in the total driving force following the switch of the upper limit value is adjusted to be lower.

8. The vehicle driving force control apparatus according to claim 7, wherein
the low upper limit value is a value determined on a basis of a continuous rating of a drive unit to which the low upper limit value is to be applied, from among the drive units.

9. The vehicle driving force control apparatus according to claim 2, wherein
the low upper limit value is a value determined on a basis of a continuous rating of a drive unit to which the low upper limit value is to be applied, from among the drive units.

10. The vehicle driving force control apparatus according to claim 1, wherein
the controller controls an amount of a total driving force output from the drive units, in accordance with a driving command for an acceleration, and moreover, causes a corresponding relationship between the driving command for the acceleration and the amount of the total driving force to change in accordance with a change in an upper limit value of the total driving force.

11. The vehicle driving force control apparatus according to claim 10, wherein
the controller controls an amount of a total driving force output from the drive units, in accordance with a driving command for an acceleration, and moreover, when the controller switches the upper limit value of the driving force of the one or more non-restricted drive units, the controller performs an adjustment control in which a temporal change in the total driving force following the switch of the upper limit value is adjusted to be gradually lower.

12. The vehicle driving force control apparatus according to claim 11, wherein
the low upper limit value is a value determined on a basis of a continuous rating of a drive unit to which the low upper limit value is to be applied, from among the drive units.

13. The vehicle driving force control apparatus according to claim 10, wherein
the low upper limit value is a value determined on a basis of a continuous rating of a drive unit to which the low upper limit value is to be applied, from among the drive units.

14. The vehicle driving force control apparatus according to claim 1, wherein
the controller controls an amount of a total driving force output from the drive units, in accordance with a driving command for an acceleration, and moreover, when the controller switches the upper limit value of the driving force of the one or more non-restricted drive units, the controller performs an adjustment control in which a temporal change in the total driving force following the switch of the upper limit value is adjusted to be gradually lower.

15. The vehicle driving force control apparatus according to claim 14, wherein
the low upper limit value is a value determined on a basis of a continuous rating of a drive unit to which the low upper limit value is to be applied, from among the drive units.

16. The vehicle driving force control apparatus according to claim 1, wherein
the low upper limit value is a value determined on a basis of a continuous rating of a drive unit to which the low upper limit value is to be applied, from among the drive units.

17. The vehicle driving force control apparatus according to claim 1, wherein the predetermined condition includes factors where output of the respective drive unit is affected,
wherein a state of each of the drive units is determined individually according to a signal received from a sensor of each of the respective drive units measuring the predetermined condition.

18. The vehicle driving force control apparatus according to claim 1, wherein the restricted drive unit includes a predetermined restriction on the restricted drive unit and the non-restricted drive unit is in the default state, and
wherein the predetermined condition includes temperature of a respective drive unit received from a sensor in the respective drive unit.

19. A vehicle driving force control apparatus mountable on a vehicle provided with drive units configured to drive a driving wheel, and configured to control the drive units, the vehicle driving force control apparatus comprising:

circuitry configured to:
control a driving force output by each of the drive units, within a range less than or equal to an upper limit value, on a basis of a driving command; and
determine according to a predetermined condition of each of the drive units whether each of the drive units is a restricted drive unit or a non-restricted drive unit, the restricted drive unit being a drive unit in a restriction-necessary state according to a level of the predetermined condition and the non-restricted drive unit being a drive unit in a default state, wherein
in a case where it is determined that any one or more of the drive units are the restricted drive units, both the upper limit value of the driving force of are the one or more restricted drive units, from among the drive units, and the upper limit value of the driving force of the one or more non-restricted drive units, from among the drive units, are switched from a normal upper limit value to a low upper limit value that is lower than the normal upper limit value.

20. The vehicle driving force control apparatus according to claim 19, wherein the predetermined condition includes factors where output of the respective drive unit is affected, wherein a state of each of the drive units is determined individually according to a signal received from a sensor of each of the respective drive units measuring the predetermined condition, and
wherein the restricted drive unit includes a predetermined restriction on the restricted drive unit and the non-restricted drive unit is in the default state.

* * * * *